US010009355B2

(12) United States Patent
Ramalingam et al.

(10) Patent No.: US 10,009,355 B2
(45) Date of Patent: Jun. 26, 2018

(54) BOOTSTRAPPING USER AUTHENTICATION ON DEVICES

(71) Applicant: Amazon Technologies, Inc., Seattle, WA (US)

(72) Inventors: Harsha Ramalingam, Kirkland, WA (US); Jesper Mikael Johansson, Redmond, WA (US); Bharath Kumar Bhimanaik, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days. days.

(21) Appl. No.: 15/182,031

(22) Filed: Jun. 14, 2016

(65) Prior Publication Data
US 2016/0294842 A1   Oct. 6, 2016

Related U.S. Application Data

(63) Continuation of application No. 13/934,848, filed on Jul. 3, 2013, now Pat. No. 9,397,989.

(51) Int. Cl.
*G06F 7/04* (2006.01)
*G06F 15/16* (2006.01)
*G06F 17/30* (2006.01)
*H04L 29/06* (2006.01)
*H04W 12/06* (2009.01)
*H04W 12/04* (2009.01)
(Continued)

(52) U.S. Cl.
CPC .......... *H04L 63/107* (2013.01); *G06F 3/0481* (2013.01); *G06F 21/35* (2013.01); *H04L 63/08* (2013.01); *H04L 63/0884* (2013.01); *H04W 12/04* (2013.01); *H04W 12/06* (2013.01); *H04L 29/06755* (2013.01); *H04L 63/1483* (2013.01); *H04L 63/18* (2013.01); *H04L 2463/082* (2013.01)

(58) Field of Classification Search
CPC ..... H04L 63/08; H04L 63/0884; H04W 12/06
See application file for complete search history.

(56) References Cited

U.S. PATENT DOCUMENTS 6,577,628 B1   6/2003   Hejza
7,523,858 B2   4/2009   Moulton et al.
7,778,932 B2   8/2010   Yan
(Continued)

OTHER PUBLICATIONS

U.S. Appl. No. 13/746,719 entitled "Scalable Account Status Management" and filed Jan. 22, 2013.
(Continued)

*Primary Examiner* — Daniel B Potratz
(74) *Attorney, Agent, or Firm* — Thomas | Horstemeyer, LLP

(57) ABSTRACT

Disclosed are various embodiments that facilitate bootstrapping authentication of a user at a first device using a second device. The second device is authenticated for access to a user account via a first security credential. A second security credential is received by the second device. The second security credential is then sent to the first device. Subsequently, the second security credential is received from the first device, and the first device is authenticated for access to the user account. The second device includes visual cues to indicate a network page is legitimate, while the first device excludes visual cues to indicate the network page is legitimate.

19 Claims, 10 Drawing Sheets

(51) Int. Cl.
  *G06F 3/0481* (2013.01)
  *G06F 21/35* (2013.01)

(56) References Cited

U.S. PATENT DOCUMENTS

| | | | |
|---|---|---|---|
| 8,555,352 B2 | 10/2013 | Moisand et al. | |
| 8,887,245 B1* | 11/2014 | Wiltzius | H04L 63/1433 |
| | | | 726/25 |
| 9,064,117 B1 | 6/2015 | Worsley | |
| 2007/0253413 A1* | 11/2007 | Citron | H04L 29/12783 |
| | | | 370/389 |
| 2008/0052245 A1 | 2/2008 | Love | |
| 2008/0072289 A1* | 3/2008 | Aoki | H04L 43/0811 |
| | | | 726/3 |
| 2009/0113527 A1 | 4/2009 | Naaman et al. | |
| 2009/0144203 A1 | 6/2009 | Hurry | |
| 2012/0137368 A1* | 5/2012 | Vanstone | G06F 21/60 |
| | | | 726/25 |
| 2013/0159154 A1 | 6/2013 | Purves et al. | |
| 2013/0252583 A1* | 9/2013 | Brown | H04W 12/06 |
| | | | 455/411 |
| 2013/0268687 A1 | 10/2013 | Schrecker | |
| 2013/0288601 A1 | 10/2013 | Chhabra | |
| 2013/0340044 A1 | 12/2013 | Litvin et al. | |
| 2013/0347013 A1 | 12/2013 | Sivaraman | |
| 2014/0013107 A1* | 1/2014 | Clair | H04L 63/18 |
| | | | 713/156 |
| 2014/0033292 A1* | 1/2014 | Moore | G06F 21/35 |
| | | | 726/9 |
| 2014/0129441 A1 | 5/2014 | Blanco et al. | |
| 2014/0189840 A1* | 7/2014 | Metke | G06F 21/41 |
| | | | 726/9 |
| 2014/0189841 A1* | 7/2014 | Metke | H04L 63/0815 |
| | | | 726/9 |
| 2014/0298419 A1* | 10/2014 | Boubez | H04L 63/08 |
| | | | 726/4 |

OTHER PUBLICATIONS

U.S. Appl. No. 13/546,626 entitled "Trustworthy Indication of Software Integrity" and filed Jul. 11, 2012.

* cited by examiner

BOOTSTRAPPING USER AUTHENTICATION ON DEVICES

CROSS-REFERENCE TO RELATED APPLICATIONS

This application is a continuation of, and claims priority to, co-pending U.S. Patent Application entitled "BOOTSTRAPPING USER AUTHENTICATION ON DEVICES," filed on Jul. 3, 2013, and assigned application Ser. No. 13/934,848, which is incorporated herein by reference in its entirety.

BACKGROUND

Phishing is a serious computer security problem in which users provide their security credentials, financial information, and/or other personal information to fraudulent applications or network sites. As part of phishing, attackers may simulate a legitimate site or application to deceive users into providing their sensitive information. To avoid succumbing to phishing schemes, users may rely upon various safeguards to verify the identity of the site or application. For example, even if a fraudulent web page otherwise replicates a legitimate web page in every respect, the browser may show an inconsistent uniform resource locator (URL) in the address bar. The user may recognize that the URL does not correspond to the legitimate web page and thereby avoid providing sensitive information.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present application relates to bootstrapping device authentication via the use of a second device. For example, mobile devices are particularly susceptible for use in phishing schemes. Mobile devices, such as smartphones, may have a relatively limited display area, which encourages simplification of user interfaces. However, such user interface simplification may omit cues on which users rely for avoiding phishing schemes. For instance, mobile browsers may omit or simplify the browser chrome, e.g., the window borders, address bar, menus, and so on. Further, developers on mobile devices may have access to control the entire user interface, thereby allowing attackers to fake an entire browser user interface, including a fake address bar.

Various embodiments of the present disclosure facilitate authentication of a user account via a mobile device without the user having to provide trusted security credentials through the mobile device. For example, the user may authenticate a user account via a desktop, laptop, or other computing device and then receive a one-time password or token that may be used to access the user account via a mobile device. The one-time password or token may be tied to characteristics of the mobile device so as to prevent authorized use via other devices.

In addition to mobile devices, the bootstrap authentication approach herein may be employed for kiosks, public terminals, smart televisions, set-top boxes, and/or other devices that may be untrusted or have limited capabilities. In one scenario, an account may require two-factor authentication that is not supported by a first device. In order to log in to the account via the first device, the user may log in using a second device that supports two-factor authentication, and then use the second device to bootstrap authentication of the first device.

Figure 1:
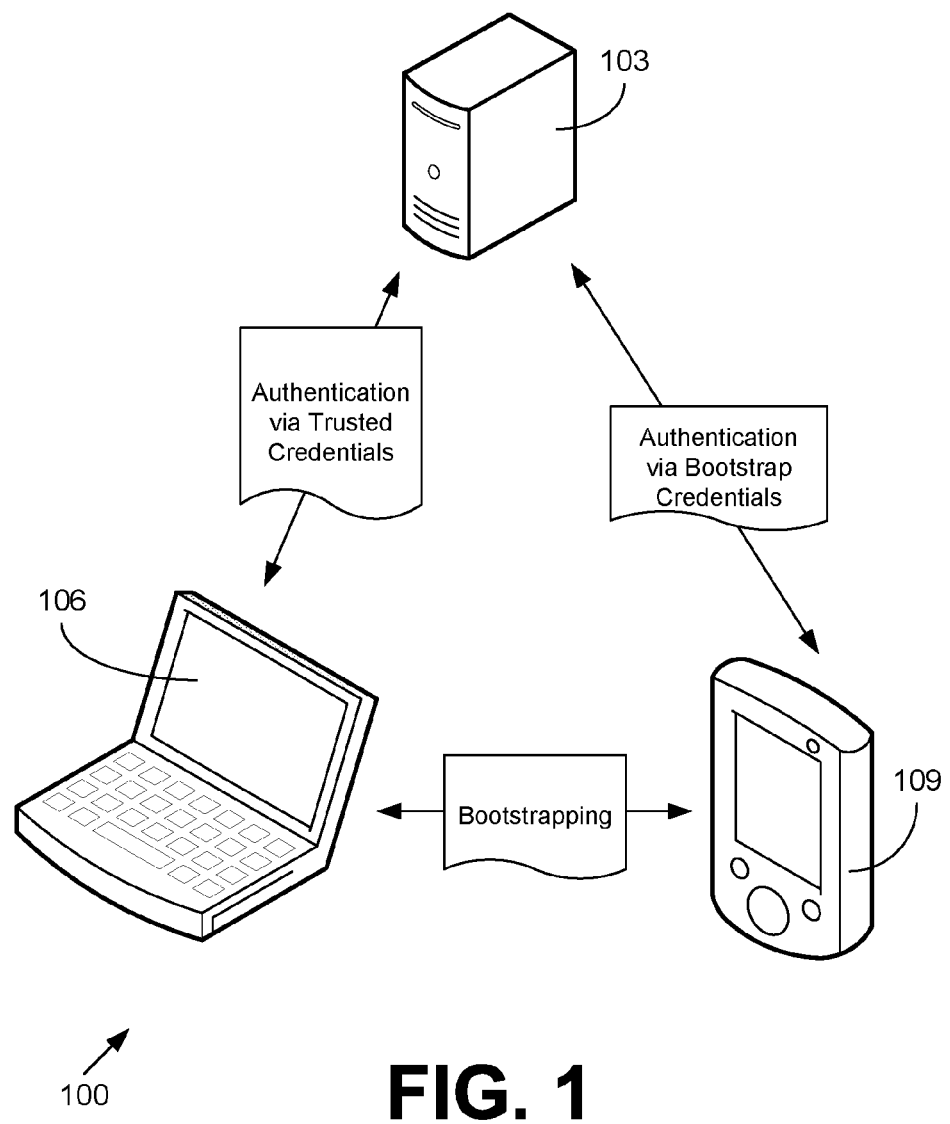
FIG. 1 is a drawing of an example scenario within a networked environment according to various embodiments of the present disclosure.

With reference to FIG. 1, shown is an example scenario within a networked environment 100, including a computing environment 103 in data communication with a primary client 106 and a bootstrap client 109 according to various embodiments. A user logs into a user account maintained in the computing environment 103 using the primary client 106. In doing so, the user provides one or more trusted credentials to the primary client 106, which may include passwords, keys, and/or other credentials. For example, it may be assumed that the primary client 106 includes adequate visual cues within a user interface so as to assure the user that the trusted credentials are being provided to the correct application or network page.

The user may wish to access the same account via the bootstrap client 109. However, the bootstrap client 109 may be a mobile device or may otherwise be unable to provide visual cues or assurances that the user interface corresponds to a legitimate application or network page on which the trusted credentials should be entered. Accordingly, it may be unsafe to enter the trusted credentials via a user interface rendered by the bootstrap client 109. In order to authenticate, the bootstrap client 109 "bootstraps" the authentication via a primary client 106 that may already be authenticated by the computing environment 103. To this end, the primary client 106 that has been authenticated sends a bootstrap request to the computing environment 103. The computing environment 103 generates a bootstrap credential, which is returned to the primary client 106.

The bootstrap credential is then communicated from the primary client 106 to the bootstrap client 109, which may involve an automated process or a manual process. For instance, the primary client 106 may display the bootstrap credential to the user, who may then enter the bootstrap credential via a user interface field rendered upon a display of the bootstrap client 109. Alternatively, the primary client 106 may communicate the bootstrap credential to the bootstrap client 109 via a wireless data connection using near-field communication (NFC), Bluetooth®, Wi-Fi®, etc. The bootstrap client 109 then may authenticate with the computing environment 103 using the bootstrap credential in order to access the user account. In the following discussion, a general description of the system and its components is provided, followed by a discussion of the operation of the same.

Figure 2:
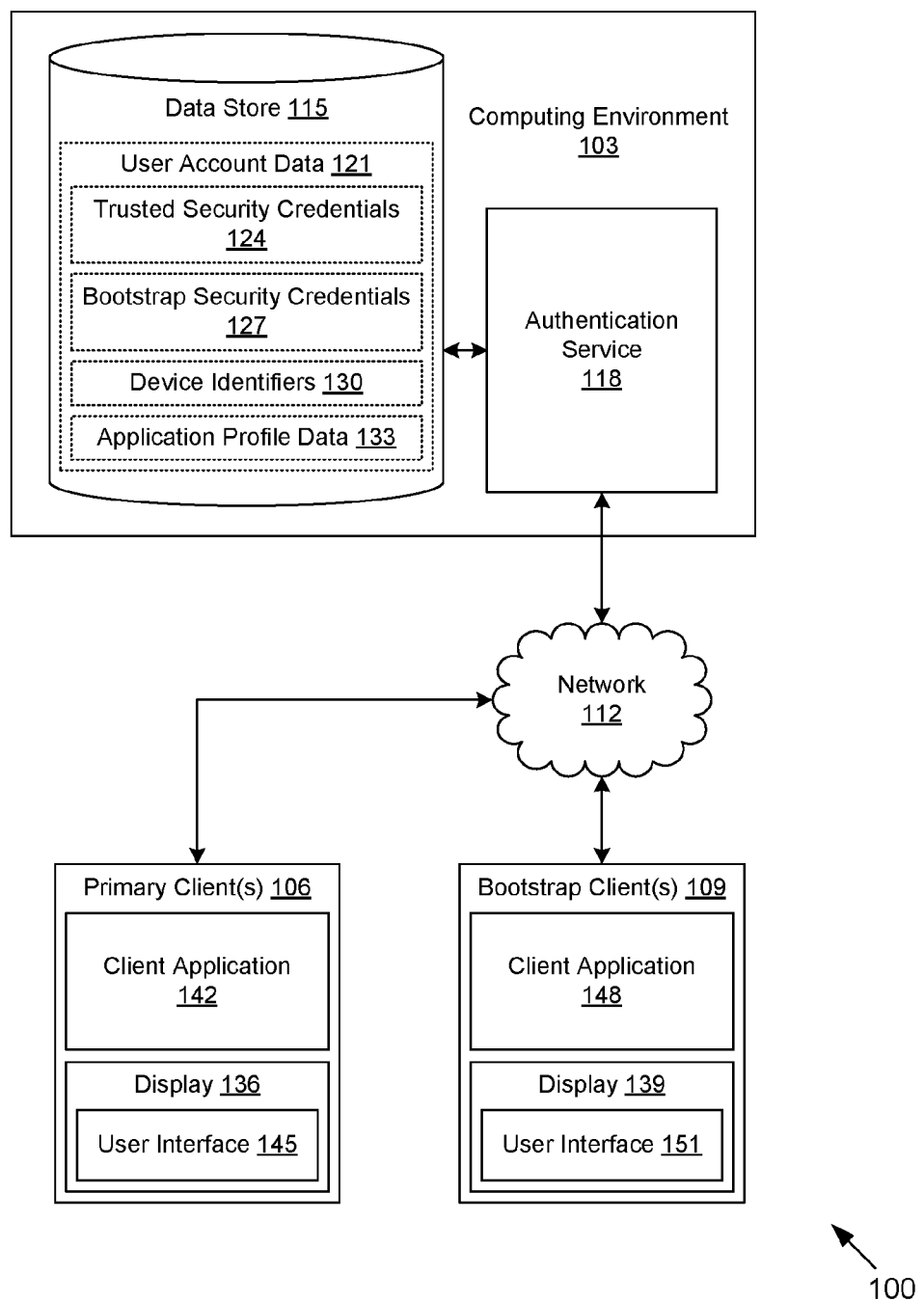
FIG. 2 is a block diagram showing a networked environment according to various embodiments of the present disclosure.

Referring next to FIG. 2, shown is a block diagram of a networked environment 100 according to various embodiments. The networked environment 100 includes a computing environment 103, one or more primary clients 106, and one or more bootstrap clients 109 in data communication via a network 112. The network 112 includes, for example, the Internet, intranets, extranets, wide area networks (WANs), local area networks (LANs), personal area networks (PANs), wired networks, wireless networks, or other suitable networks, etc., or any combination of two or more such networks. Additionally, the bootstrap client 109 may be in data communication with the primary client 106 via a communications channel separate from the network 112, e.g., NFC, Bluetooth®, infrared, and/or other technologies.

The computing environment 103 may comprise, for example, a server computer or any other system providing computing capability. Alternatively, the computing environment 103 may employ a plurality of computing devices that are arranged, for example, in one or more server banks or computer banks or other arrangements. Such computing devices may be located in a single installation or may be distributed among many different geographical locations. For example, the computing environment 103 may include a plurality of computing devices that together may comprise a hosted or "cloud" computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 115 that is accessible to the computing environment 103. The data store 115 may be representative of a plurality of data stores 115 as can be appreciated. The data stored in the data store 115, for example, is associated with the operation of the various applications and/or functional entities described below.

The components executed on the computing environment 103, for example, include an authentication service 118 and other applications, services, processes, systems, engines, or functionality not discussed in detail herein. The authentication service 118 is executed to authenticate users at the primary clients 106 and bootstrap clients 109 for access to user accounts. In some embodiments, the authentication service 118 may serve up network pages that include user interfaces for logging onto user accounts and requesting bootstrap credentials. In other embodiments, the authentication service 118 may communicate with applications executed by the primary clients 106 and/or bootstrap clients 109 by way of an application programming interface (API). The authentication service 118 may correspond to an independent or federated identity provider and/or may facilitate a single sign-on experience for multiple different systems, services, etc., operated by one or more organizations.

The data stored in the data store 115 includes, for example, user account data 121 and potentially other data. The user account data 121 corresponds to data regarding user accounts for multiple users. The user account data 121 may include, for example, trusted security credentials 124, bootstrap security credentials 127, device identifiers 130, application profile data 133, and/or other data. The trusted security credentials 124 may correspond to usernames, passwords, keys, answers to knowledge-based questions, social security numbers, and/or other private information. In some cases, the trusted security credentials 124 may correspond to long-lived security credentials. Such credentials may be expected to persist for at least a predetermined length of time or indefinitely. For instance, the trusted security credentials 124 may be assumed to be valid until the user changes them. Alternatively, the trusted security credentials 124 may be valid for a month, six months, or another period of time according to a predefined security policy.

The bootstrap security credentials 127 correspond to security credentials of an ephemeral nature that are used to authenticate bootstrap clients 109. For example, the bootstrap security credentials 127 may include a one-time password, a personal identification number, a token, or other types of credentials. The bootstrap security credentials 127 may be relatively less trusted than the trusted security credentials 124. For example, the trusted security credentials 124 may be user-defined passwords that are intended to be long lived, while the bootstrap security credentials 127 may be automatically generated numerical codes or dictionary words that are valid for a relatively shorter period of time. The bootstrap security credentials 127 may be relatively less trusted because they may be selected for ease of memorization rather than credential strength. The bootstrap security credentials 127 may be valid for a predetermined length of time (e.g., an hour, a day, etc.) and/or may expire in response to certain events. Non-limiting examples of events that may trigger expiration may include a change to applications executed in the bootstrap client 109, a detected physical or network location of the bootstrap client 109, different bootstrap clients 109 using the same bootstrap security credential 127, a change in a network address of the bootstrap client 109, and/or other events. The bootstrap security credentials 127 may be generated for specific bootstrap clients 109 and may be invalid for use by other bootstrap clients 109.

The device identifiers 130 may include unique device identifiers, unique software identifiers, network addresses, media access control (MAC) addresses, serial numbers, and/or other types of identifiers for bootstrap clients 109. The device identifiers 130 may be employed in order to generate bootstrap security credentials 127. A bootstrap security credential 127 may be tied to a particular device identifier 130 so that it is valid only for a particular bootstrap client 109. The application profile data 133 may describe or profile applications installed upon the bootstrap clients 109 in order to facilitate detecting a change in such applications. For example, it may be desired to expire access to a user account via a bootstrap security credential 127 when the content of an application that accesses the user account changes.

The primary client 106 and the bootstrap client 109 are representative of a plurality of client devices that may be coupled to the network 112. The primary clients 106 and the bootstrap clients 109 may each comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. In one example, the primary client 106 may be a desktop device, and the bootstrap client 109 may be a mobile device. The primary client 106 may include a display 136, and the bootstrap client 109 may include a display 139. The displays 136, 139 may comprise, for example, one or more devices such as liquid crystal display (LCD) displays, gas plasma-based flat panel displays, organic light emitting diode (OLED) displays, electrophoretic ink (E Ink) displays, LCD projectors, or other types of display devices, etc.

The primary client 106 may be configured to execute various applications such as a client application 142 and/or other applications. The client application 142 may be executed in a primary client 106, for example, to access network content served up by the computing environment 103 and/or other servers, thereby rendering a user interface 145 on the display 136. The client application 142 may, for example, correspond to a browser, a mobile application, etc., and the user interface 145 may correspond to a network page, a mobile application screen, etc. The primary client 106 may be configured to execute applications beyond the client application 142 such as, for example, browsers, mobile applications, email applications, social networking applications, and/or other applications.

The bootstrap client 109 may be configured to execute various applications such as a client application 148 and/or other applications. The client application 148 may be executed in a bootstrap client 109, for example, to access network content served up by the computing environment 103 and/or other servers, thereby rendering a user interface 151 on the display 139. The client application 148 may, for example, correspond to a browser, a mobile application, etc., and the user interface 151 may correspond to a network page, a mobile application screen, etc. The bootstrap client 109 may be configured to execute applications beyond the client application 148 such as, for example, browsers, mobile applications, email applications, social networking applications, and/or other applications.

Next, a general description of the operation of the various components of the networked environment 100 is provided. To begin, a user employs a primary client 106 to authenticate using trusted security credentials 124 for access to resources associated with a user account. For example, the user provides a username and password to the authentication service 118 by filling out a form in a network page. The user is reassured that the network page is legitimate due to browser chrome and/or other visual cues.

Subsequently, the user may wish to gain access via a mobile device or other bootstrap client 109. Unlike the primary client 106, the bootstrap client 109 may be more susceptible to phishing attacks due to the control given to developers over the user interface 151, the lack of browser chrome, and/or other factors. It may be the case that an attacker could completely fake a user interface 151 on the bootstrap client 109. These issues may weigh against providing trusted security credentials 124 via the bootstrap clients 109.

To provide access to the bootstrap client 109, a bootstrap security credential 127 is requested via the primary client 106 that has already been authenticated. The bootstrap security credential 127 is thus generated and returned to the primary client 106. The primary client 106 communicates the bootstrap security credential 127 to the bootstrap client 109 via manual user entry, quick response (QR) or other machine-readable code, wireless data transmission, or other approaches. The bootstrap client 109 is thereby able to authenticate with the authentication service 118 for access to the user account with the bootstrap security credential 127. It is noted that the trusted security credentials 124 need not be provided by the bootstrap client 109 in order to authenticate.

Device identifiers 130 may be used in order to prevent usage of a bootstrap security credential 127 by non-authorized devices. For example, a device identifier 130 may be generated by a bootstrap client 109, communicated to the primary client 106, and onto the authentication service 118. The bootstrap security credential 127 may be generated based at least in part on the device identifier 130 and/or otherwise associated with the device identifiers 130 such that bootstrap clients 109 lacking access to the device identifier 130 are unable to authenticate using the bootstrap security credential 127. Public-key encryption utilizing the device identifiers 130 may be used for signing the bootstrap security credential 127 or performing other functions for verification of the bootstrap clients 109.

In contrast to the trusted security credentials 124, the bootstrap security credentials 127 may be short lived or temporary. For example, authenticated sessions using the bootstrap security credentials 127 may expire after 30 minutes. By contrast, authenticated sessions using the trusted security credentials 124 may last longer or even indefinitely. This difference may ensure close proximity between the primary client 106 and the bootstrap client 109. In one embodiment, the bootstrap security credentials 127 may expire or have limited use based at least in part on the location of the bootstrap clients 109. For example, if the bootstrap security credentials 127 are initially requested for use at a certain location, the bootstrap security credentials 127 may be unusable more than a half mile from that location.

Such functionality may be especially useful in the context of stationary devices such as televisions, which may be expected to remain in the same location for a relatively long period of time. For example, if a television is moved, it may be the case that it was sold, which may be a good reason to expire the bootstrap security credentials 127. Subsequent bootstrapping may be necessary to continue authenticated account access for the bootstrap client 109. Otherwise, access to the user account by the bootstrap client 109 may be disabled. Alternatively, the user of the bootstrap client 109 may be prompted to confirm whether the authentication period should be renewed or revoked prior to a tentative expiration of the access granted in the authentication period.

As client applications 148 request additional or different security privileges, subsequent bootstrapping may be necessary. Further, the code underlying the client application 148 may change, and this may prompt subsequent bootstrapping. For example, a web application may be self-updating, and the updated code may not correspond to stored application profile data 133. In response to such changes to applications, the bootstrap client 109 may need to be bootstrapped again.

In one embodiment, a bootstrap client 109, once authenticated, may be employed to bootstrap the authentication of other bootstrap clients 109 in like manner. For example, once a user's smartphone is authenticated via bootstrapping, the smartphone may then be considered a trusted device. Subsequently, the user may use the smartphone to bootstrap the authentication of a tablet.

In one embodiment, the client application 142 may be configured to bootstrap any bootstrap client 109 connected to the primary client 106 via a private or trusted network 112 (FIG. 2), e.g., a home Wi-Fi network 112. Such bootstrapping may be done automatically or subject to user approval of the particular bootstrap client 109 via the client application 142. A network 112 may be considered "trusted," for example, when the devices connected to the network 112 are in close proximity to the user such as with a home network 112.

In some scenarios, different classes of resources may be made available to clients depending on how they are authenticated. For example, a primary client 106 authenticated with trusted security credentials 124 may be given a higher level of access to resources of a user account as compared to a bootstrap client 109. Further, the method used to bootstrap a bootstrap client 109 may also impact which classes of resources are made available. For example, manual bootstrapping via manual code entry may be considered more trustworthy than automatic bootstrapping via a private wireless network 112. Similarly, automatic bootstrapping with a manual approval process may be considered more trustworthy than purely automatic bootstrapping.

Techniques relevant to bootstrapping authentication may be found in U.S. patent application Ser. No. 13/546,626 entitled "TRUSTWORTHY INDICATION OF SOFTWARE INTEGRITY" and filed on Jul. 11, 2012, and U.S. patent application Ser. No. 13/746,719 entitled "SCALABLE ACCOUNT STATUS MANAGEMENT" and filed on Jan. 22, 2013, both of which are incorporated herein by reference in their entirety.

Figure 3A:
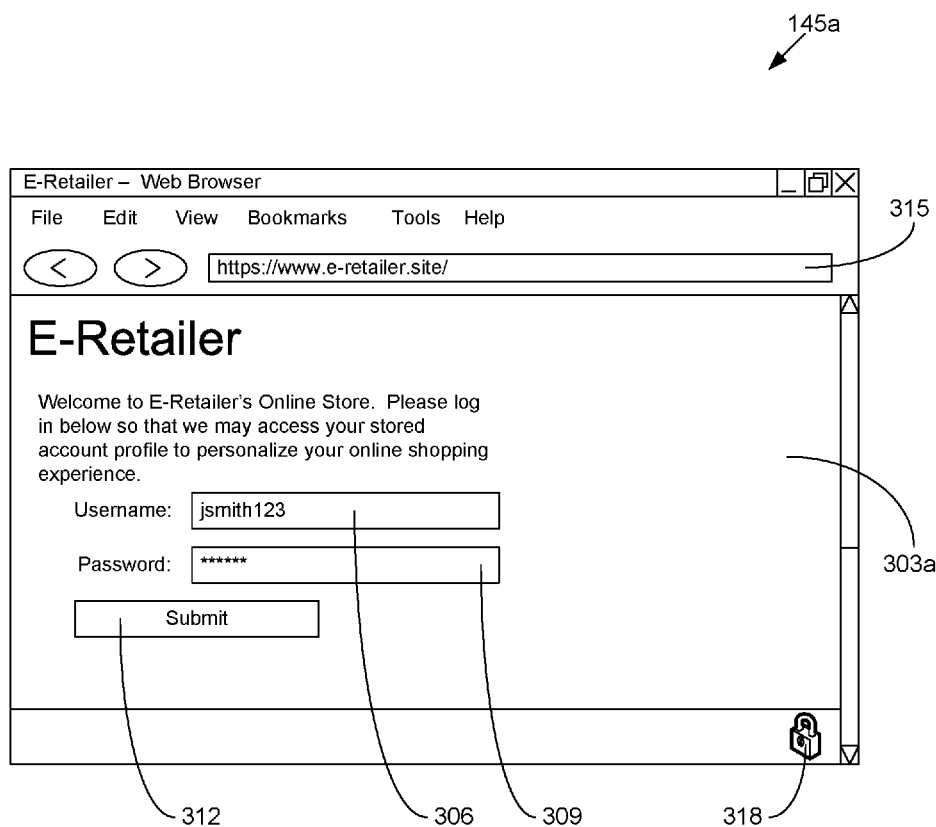
FIGS. 3A-3C are drawings of example user interfaces rendered by a primary client in the networked environment of FIG. 2 according to various embodiments of the present disclosure.

Referring next to FIG. 3A, shown is one example of a user interface 145a rendered by a client application 142 (FIG. 2) executed in a primary client 106 (FIG. 2) in the networked environment 100 (FIG. 2) according to one embodiment. Specifically, the client application 142 is a browser that is rendering a network page 303a served up by the computing environment 103 (FIG. 2). The network page 303a facilitates authentication with the authentication service 118 (FIG. 2) in order to access resources associated with a user account of an online retailer. A username field 306 is provided in order for the user to enter a username, a password field 309 is provided in order for the user to enter a password, and a submit component 312 is provided to submit the username and password to the authentication service 118 via the network 112 (FIG. 2).

In this example, the user has filled in username "jsmith123" in the username field 306 and a password in the password field 309. The username and password correspond to trusted security credentials 124 (FIG. 2) of the user account. In some scenarios, the username and password may be stored in the primary client 106 and automatically populated. Alternatively, a cookie may be stored in the primary client 106 that facilitates automatic login. Biometric data, private keys, answers to knowledge-based questions, and so on may be used in addition to or in place of username and password in some embodiments.

Various elements of browser chrome are present in the user interface 145a to reassure the user that the network page 303a corresponds to a legitimate site. To this end, an address bar 315 may show the uniform resource locator (URL) corresponding to the site and a lock icon 318 may indicate the use of secure sockets layer (SSL) or another form of encryption. Window framing, scroll bars, menu bars, taskbars, and so on may also be present to assure the user that the user interface 145a was indeed generated by the browser. Thus, the user may confidently supply the trusted security credentials 124.

Figure 3B:
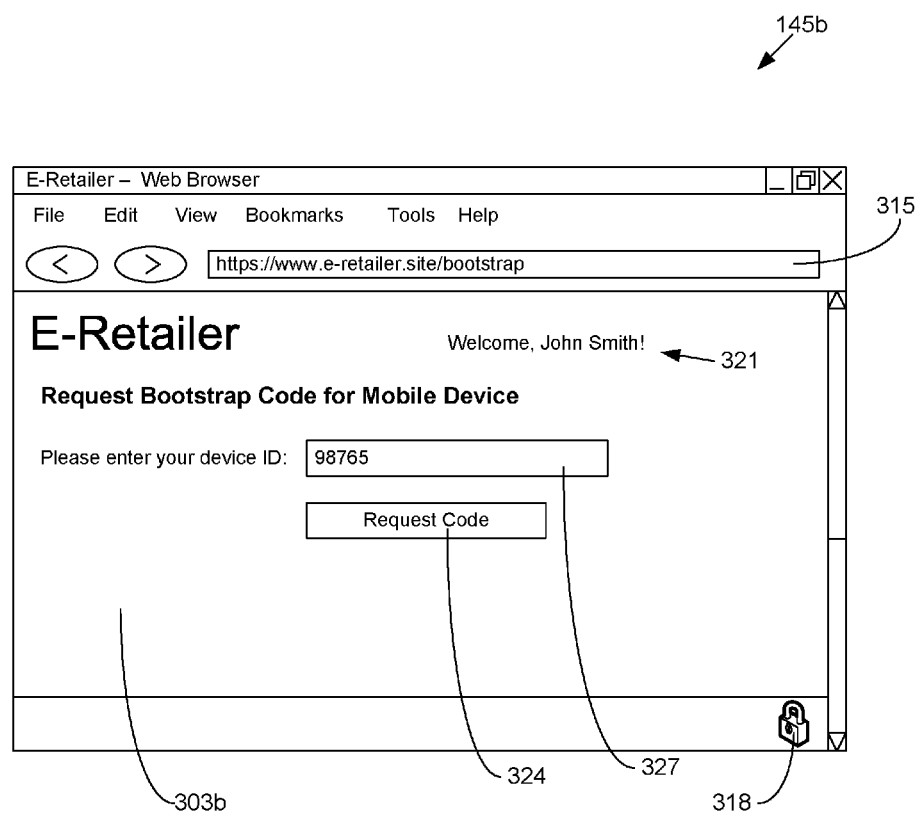

Turning now to FIG. 3B, shown is one example of a user interface 145b rendered by a client application 142 (FIG. 2) executed in a primary client 106 (FIG. 2) in the networked environment 100 (FIG. 2) according to one embodiment. Specifically, the client application 142 is a browser that is rendering a network page 303b served up by the computing environment 103 (FIG. 2). The network page 303b facilitates requesting bootstrap security credentials 127 (FIG. 2) from the authentication service 118 (FIG. 2). The network page 303b indicates at label 321 that the user account for "John Smith" has been successfully authenticated.

A request component 324 is provided in order to submit a request for a bootstrap security credential 127. In this example, a device identifier field 327 is provided in order for the user to specify a particular device identifier 130 (FIG. 2) for which the bootstrap security credential 127 is to be generated. In this case, the user has entered the device identifier 130 of "98765." In other examples, it may be that no device identifier 130 is necessary. In some cases, no explicit request for the bootstrap security credentials 127 may be necessary. For example, the bootstrap security credentials 127 may be automatically downloaded to, or preexisting in, the primary client 106.

Figure 3C:
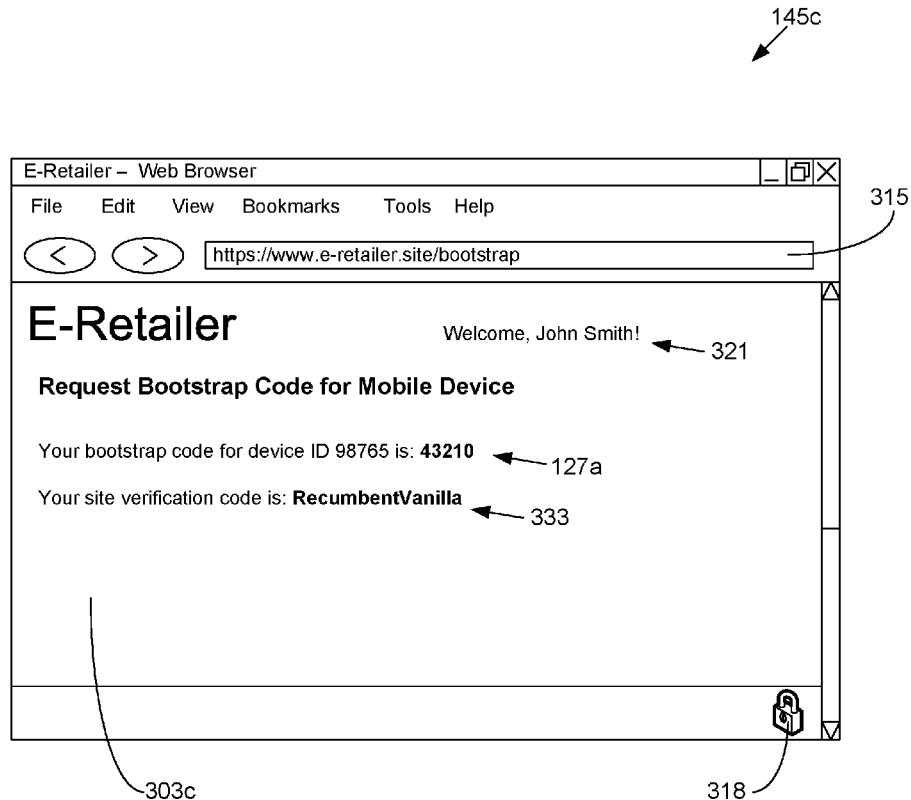

Moving on to FIG. 3C, shown is one example of a user interface 145c rendered by a client application 142 (FIG. 2) executed in a primary client 106 (FIG. 2) in the networked environment 100 (FIG. 2) according to one embodiment. Specifically, the client application 142 is a browser that is rendering a network page 303c served up by the computing environment 103 (FIG. 2). The network page 303c facilitates receiving bootstrap security credentials 127 (FIG. 2) from the authentication service 118 (FIG. 2). To this end, the network page 303c presents a bootstrap security credential 127a of "43210," and a site verification credential 333 of "RecumbentVanilla." The user can view the site verification credential 333 to ensure that the network site accessed by the primary client 106 and the bootstrap client 109 (FIG. 2) is the same, in other words, that both show the same site verification credential 333.

Figure 3D:
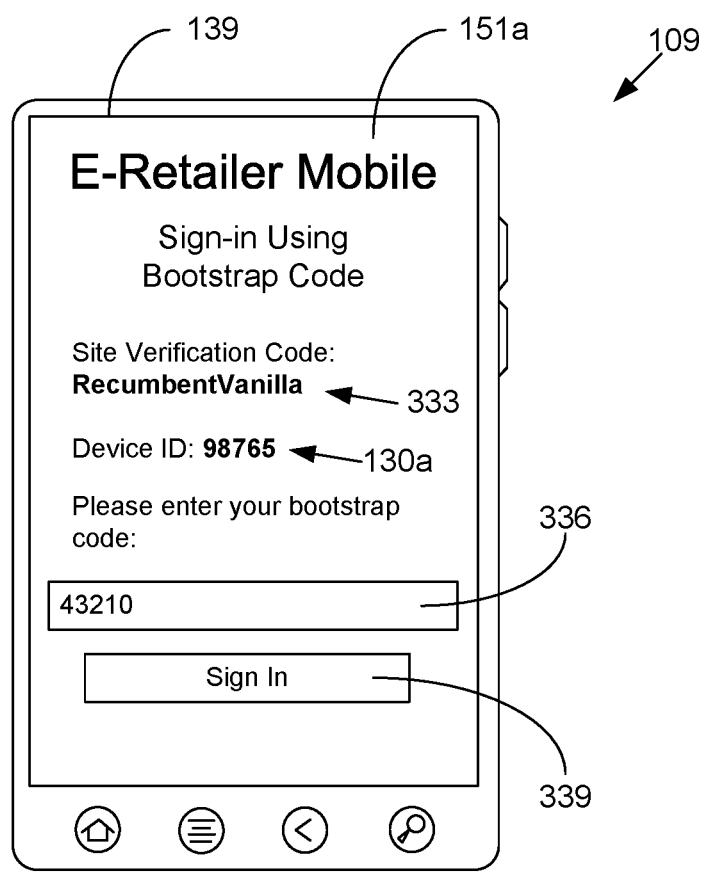
FIG. 3D is a drawing of an example of a user interface rendered by a bootstrap client in the networked environment of FIG. 2 according to various embodiments of the present disclosure.

Continuing to FIG. 3D, shown is one example of a user interface 151a rendered upon a display 139 by a client application 148 (FIG. 2) executed in a bootstrap client 109 in the networked environment 100 (FIG. 2) according to one embodiment. The user interface 151a allows the user to sign in to the same user account in as the examples of FIGS. 3A-3C through the use of a bootstrap security credential 127 (FIG. 2).

To this end, the user interface 151a includes a bootstrap code field 336 and a submit component 339. In the bootstrap code field 336, the user has entered the bootstrap security credential 127a (FIG. 3C) of "43210." The site verification credential 333 is present to assure the user that the user interface 151a corresponds to the same network site as that accessed in the example of FIG. 3C. The device identifier 130a may be shown in order for the user to populate the device identifier field 327 (FIG. 3B). The device identifier 130a in this example is "98765," which is the same as that entered in the device identifier field 327. The device identifier 130a may be generated by the client application 148 or received from the authentication service 118. Upon entering the bootstrap security credential 127a, the authentication service 118 may authenticate the bootstrap client 109, thereby permitting the client application 148 and/or other applications in the bootstrap client 109 to access resources associated with the user account.

Figure 4A:
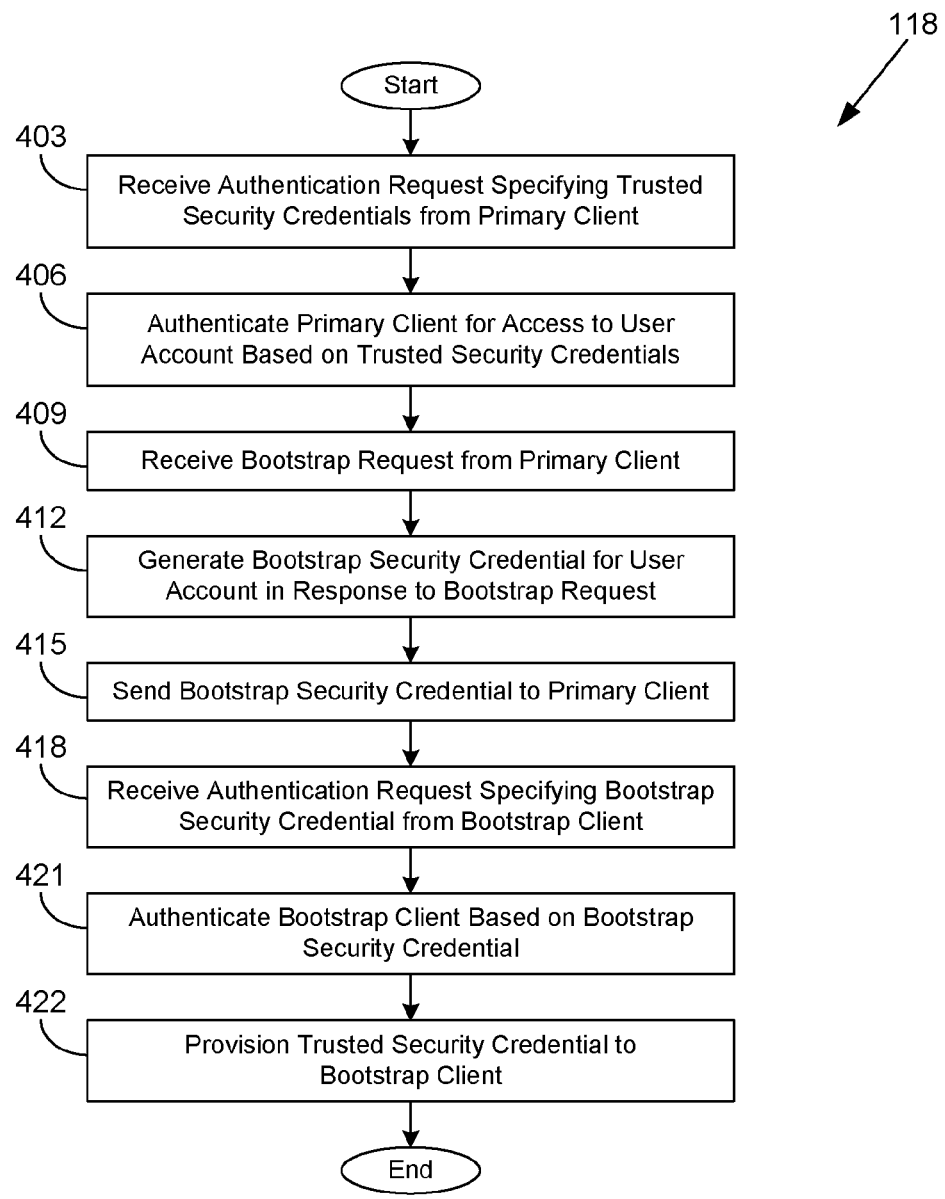
FIG. 4A is a flowchart illustrating one example of functionality implemented as portions of an authentication service executed in a computing environment in the networked environment of FIG. 2 according to various embodiments of the present disclosure.

Referring next to FIG. 4A, shown is a flowchart that provides one example of the operation of a portion of the authentication service 118 according to various embodiments. It is understood that the flowchart of FIG. 4A provides merely an example of the many different types of functional arrangements that may be employed to implement the operation of the portion of the authentication service 118 as described herein. As an alternative, the flowchart of FIG. 4A may be viewed as depicting an example of steps of a method implemented in the computing environment 103 (FIG. 2) according to one or more embodiments.

Beginning with box 403, the authentication service 118 receives an authentication request specifying one or more trusted security credentials 124 (FIG. 2) from a primary client 106 (FIG. 2). In box 406, the authentication service 118 authenticates the primary client 106 for access to a user account based at least in part on the trusted security credentials 124. For example, the authentication service 118 may calculate a hash value from a password obtained from the primary client 106 and compare the hash value with a stored hash value corresponding to the trusted security credentials 124 to determine whether they match.

In box 409, the authentication service 118 receives a bootstrap request from the primary client 106. In box 412, the authentication service 118 generates a bootstrap security credential 127 (FIG. 2) in response to the bootstrap request. Where the bootstrap request specifies a particular device identifier 130 (FIG. 2), the bootstrap security credential 127 may be generated based at least in part on the particular device identifier 130, or, the bootstrap security credential 127 may be associated with the particular device identifier 130. In box 415, the authentication service 118 sends the bootstrap security credential 127 to the primary client 106. In other embodiments, the bootstrap security credential 127 may be embedded in the primary client 106 and may be unlocked or authorized for use by the action of the authentication service 118.

In box 418, the authentication service 118 receives an authentication request that specifies the bootstrap security credential 127 from the bootstrap client 109 (FIG. 2). In box 421, the authentication service 118 authenticates the bootstrap client 109 based at least in part on the bootstrap security credential 127. Additionally, the authentication service 118 may ensure that a device identifier 130 associated with the bootstrap client 109 corresponds to the particular bootstrap security credential 127 to ensure that the bootstrap security credential 127 is not being used by an unauthorized device. In box 422, the authentication service 118 may optionally provision a trusted security credential 124 to the bootstrap client 109 that has been authenticated. Thereafter, the portion of the authentication service 118 ends.

Figure 4B:
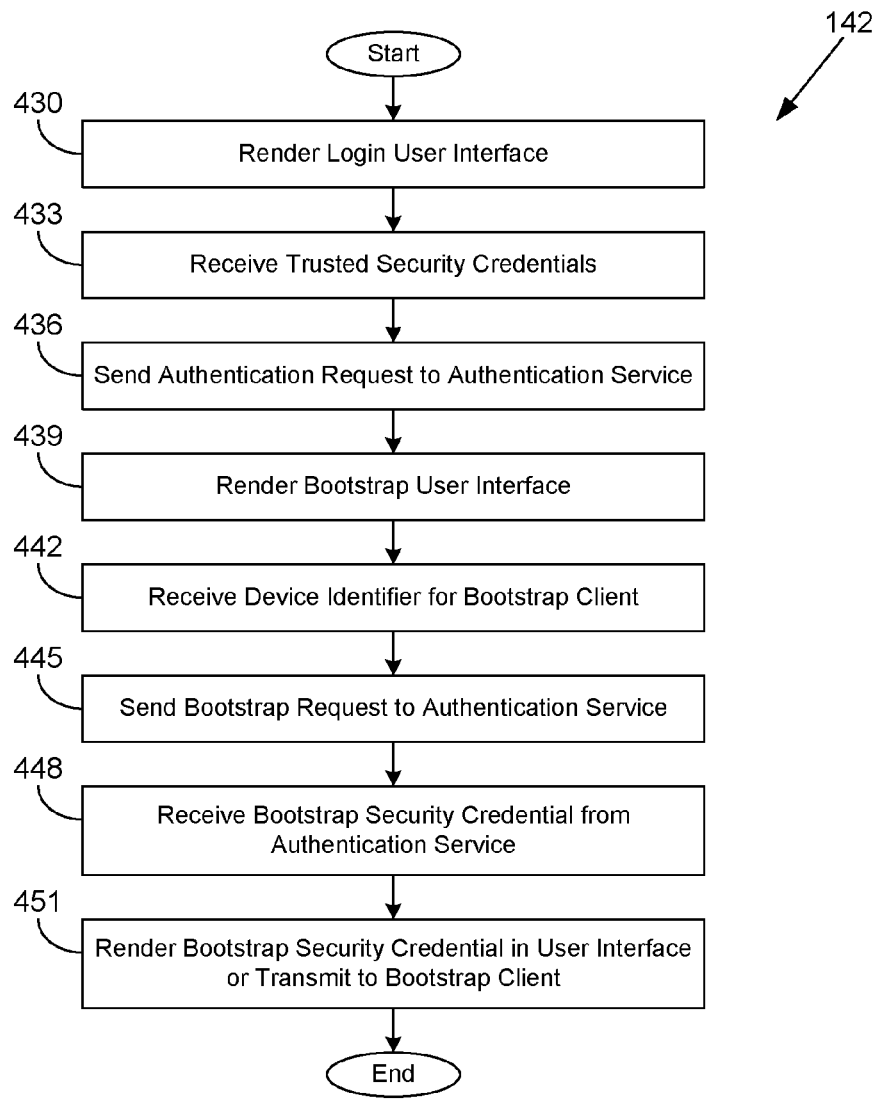
FIG. 4B is a flowchart illustrating one example of functionality implemented as portions of a client application executed in a primary client in the networked environment of FIG. 2 according to various embodiments of the present disclosure.

Turning now to FIG. 4B, shown is a flowchart that provides one example of the operation of a portion of the client application 142 according to various embodiments. It is understood that the flowchart of FIG. 4B provides merely an example of the many different types of functional arrangements that may be employed to implement the operation of the portion of the client application 142 as described herein. As an alternative, the flowchart of FIG. 4B may be viewed as depicting an example of steps of a method implemented in the primary client 106 (FIG. 2) according to one or more embodiments.

Beginning with box 430, the client application 142 renders a login user interface 145 such as that shown in FIG. 3A. In box 433, the client application 142 receives trusted security credentials 124 (FIG. 2). The trusted security credentials 124 may be input by a user. Alternatively, the trusted security credentials 124 may be stored or embedded in the primary client 106 and loaded automatically by a credential manager. In box 436, the client application 142 sends the trusted security credentials 124 to the authentication service 118 (FIG. 2) within an authentication request. Subsequently, the authentication service 118 authenticates the primary client 106 for access to resources associated with the user account.

In box 439, the client application 142 renders a bootstrap user interface 145 (FIG. 2) such as that shown in FIG. 3B. In box 442, the client application 142 receives a device identifier 130 (FIG. 2) for the bootstrap client 109 (FIG. 2). For example, a user may fill out a form field in the bootstrap user interface 145, the primary client 106 may capture a quick response (QR) code rendered by the bootstrap client 109, or the primary client 106 may learn of the device identifier 130 by other wireless approaches. In box 445, the client application 142 sends a bootstrap request to the authentication service 118. The bootstrap request may specify the device identifier 130.

In box 448, the client application 142 receives a bootstrap security credential 127 from the authentication service 118. In box 451, the client application 142 renders the bootstrap security credential 127 in a user interface 145. Alternatively, the client application 142 may communicate the bootstrap security credential 127 to the bootstrap client 109 via QR code captured with a camera, encoded audio captured with a microphone, wired or wireless data connection, or another approach. In some cases, the client application 142 may also receive a site verification credential 333 (FIG. 3C) and render this code within the user interface 145. Thereafter, the portion of the client application 142 ends.

Figure 4C:
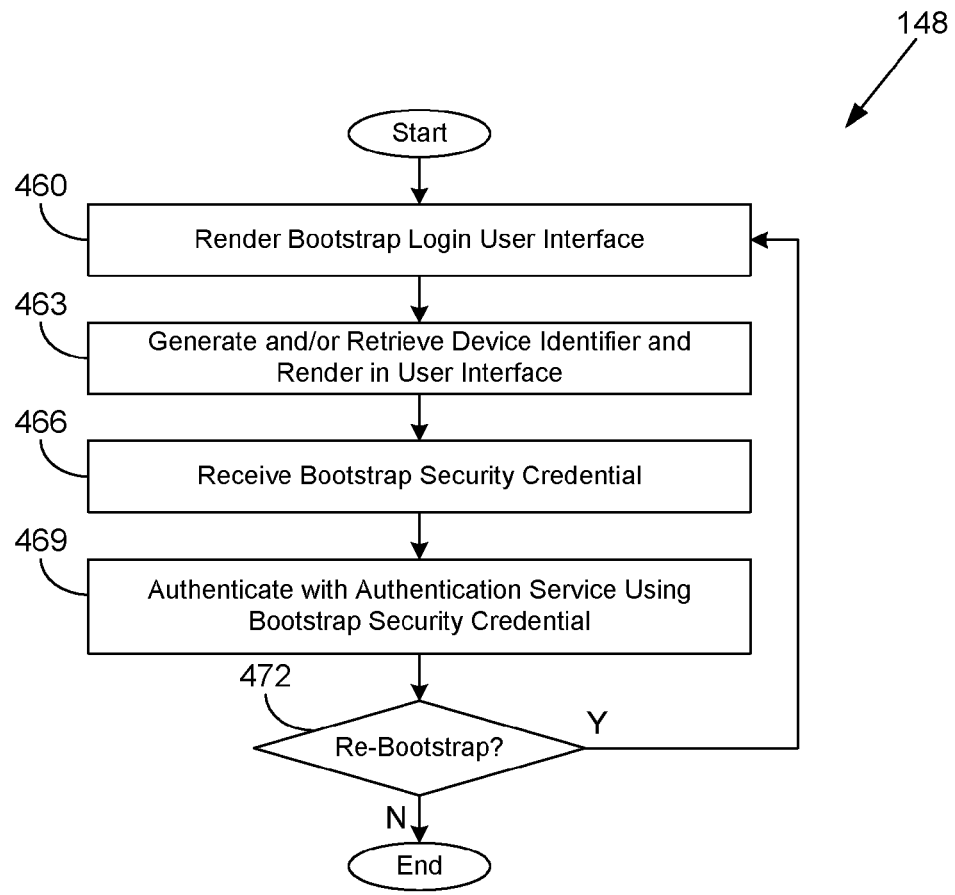
FIG. 4C is a flowchart illustrating one example of functionality implemented as portions of a client application executed in a bootstrap client in the networked environment of FIG. 2 according to various embodiments of the present disclosure.

Moving on to FIG. 4C, shown is a flowchart that provides one example of the operation of a portion of the client application 148 according to various embodiments. It is understood that the flowchart of FIG. 4C provides merely an example of the many different types of functional arrangements that may be employed to implement the operation of the portion of the client application 148 as described herein. As an alternative, the flowchart of FIG. 4C may be viewed as depicting an example of steps of a method implemented in the bootstrap client 109 (FIG. 2) according to one or more embodiments.

Beginning with box 460, the client application 148 renders a bootstrap login user interface 151 (FIG. 2), such as that shown in FIG. 3D. In box 463, the client application 148 may generate and/or retrieve a device identifier 130 (FIG. 2) and present the device identifier 130 within the user interface 151. In box 466, the client application 148 receives a bootstrap security credential 127 (FIG. 2). For example, a user may manually fill out a form field with the bootstrap security credential 127 obtained from the primary client 106 (FIG. 2). Alternatively, the client application 148 may obtain the bootstrap security credential 127 by way of a QR code rendered by the primary client 106 or through a wireless data connection with the primary client 106.

In box 469, the client application 148 authenticates with the authentication service 118 (FIG. 2) using the bootstrap security credential 127 for access to the user account. In box 472, the client application 148 determines whether re-bootstrapping is needed. In other words, the client application 148 determines whether it is necessary to authenticate again with the authentication service 118 using a new bootstrap security credential 127. Re-bootstrapping may be called for after a predetermined time period expires or in response to detecting a certain event, such as a change to application code or change in security privileges granted to an application as determined through the application profile data 133 (FIG. 2). If re-bootstrapping is called for, the client application 148 returns to box 460. Otherwise, the portion of the client application 148 ends.

Figure 5:
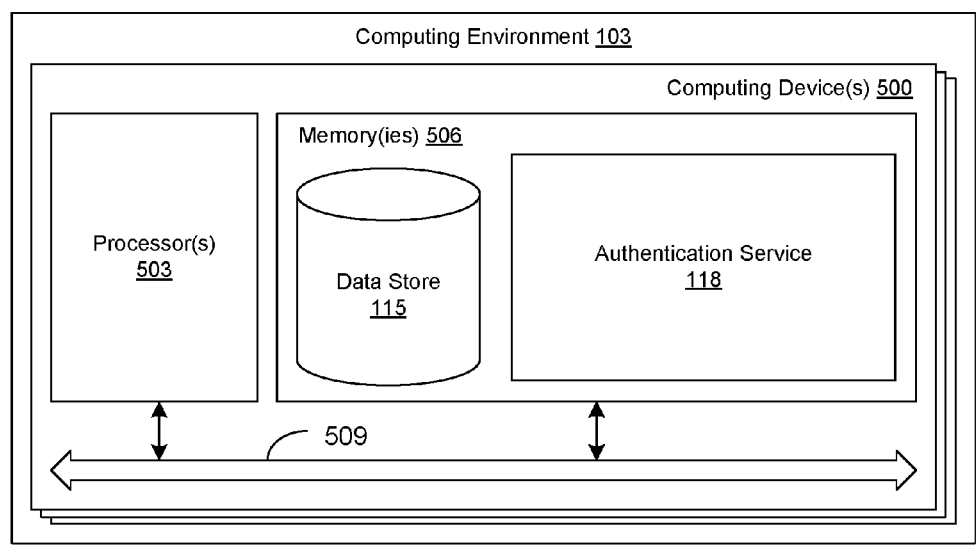
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 103 according to an embodiment of the present disclosure. The computing environment 103 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the authentication service 118 and potentially other applications. Also stored in the memory 506 may be a data store 115 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the authentication service 118, the client applications 142 and 148 (FIG. 2), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4A-4C show the functionality and operation of an implementation of portions of the authentication service 118, the client application 142, and the client application 148. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 4A-4C show a specific order of execution, it is understood that the order of execution may differ from that which is depicted. For example, the order of execution of two or more blocks may be scrambled relative to the order shown. Also, two or more blocks shown in succession in FIGS. 4A-4C may be executed concurrently or with partial concurrence. Further, in some embodiments, one or more of the blocks shown in FIGS. 4A-4C may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the authentication service 118 and the client applications 142 and 148, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program that, when executed in at least one computing device, causes the at least one computing device to at least:
   authenticate a first application executed on a first computing device to access a user account on a network site based at least in part on a trusted security credential received from the first application, the first application providing at least one visual cue indicating that a first current network page is legitimate;
   send a bootstrap security credential to the first application that has been authenticated;
   display, by the first application, a first user interface containing the bootstrap security credential and a site verification credential;
   display, by a second computing device, a second user interface configured to receive the bootstrap security credential from a user and present the site verification credential; and
   authenticate a second application executed on the second computing device for access to the user account on the network site based at least in part on the bootstrap security credential being manually entered in the second user interface and received from the second application in an authentication request that excludes the trusted security credential, the second application omitting visual cues to indicate a second current network page is legitimate.

2. The non-transitory computer-readable medium of claim 1, wherein the second application comprises a browser omitting at least one of: window borders, an address bar, or a menu.

3. The non-transitory computer-readable medium of claim 1, wherein
   the second user interface includes an input field for inputting the bootstrap security credential.

4. The non-transitory computer-readable medium of claim 3, wherein the at least one computing device causes the input field to be rendered by the second application based at least in part on serving up a network page that includes the input field.

5. The non-transitory computer-readable medium of claim 1, wherein when executed the program further causes the at least one computing device to at least:
   detect a change to the second application; and
   disable access to the user account by the second application in response to the change to the second application.

6. A system, comprising:
   a data store storing user account data; and
   at least one computing device comprising a hardware processor in communication with the data store, the at least one computing device being configured to at least:
      authenticate a first application executed on a first device for access to a user account on a network site based at least in part on the user account data, the first application providing at least one visual cue indicating that a first current network page is legitimate;
      receive a request for a bootstrap security credential from the first application that has been authenticated;
      send the bootstrap security credential to the first application;
      cause the first application to display a first user interface containing the bootstrap security credential and a site verification credential;
      receive a request from a second application executed on a second device for access to the user account on the network site;
      cause the second application to display a second user interface configured to receive the bootstrap security credential from a user and present the site verification credential; and
      authenticate the second application for access to the user account on the network site based at least in part on the bootstrap security credential being received from the second application, wherein the bootstrap security credential is manually entered in the second application, the bootstrap security credential excluding the user account data, and the second application excluding the at least one visual cue to indicate a second current network page is legitimate.

7. The system of claim 6, wherein the at least one computing device is further configured to at least cause an input field to be rendered by the second application.

8. The system of claim 7, wherein the at least one computing device causes the first application to render the bootstrap security credential on a display based at least in part on serving up a network page including the bootstrap security credential.

9. The system of claim 6, wherein the user account data comprises a plurality of user accounts and the at least one computing device is configured to authenticate the first application for access to the user account by matching a trusted security credential with one of the plurality of user accounts in the data store.

10. The system of claim 6, wherein the at least one visual cue comprises a lock icon indicating communications between the at least one computing device and the first application are secured using Secure Socket Layer (SSL) encryption.

11. The system of claim 6, wherein the at least one computing device is further configured to at least:
detect a change in a network address of the second application; and
disable access to the user account for the second application in response to the change in the network address.

12. A method, comprising:
authenticating, via at least one of one or more computing devices, a first computing device to access a user account based at least in part on a security credential received from the first computing device, the first computing device providing at least one visual cue indicating that a first current application is legitimate;
generating, via at least one or more of the one or more computing devices, a bootstrap security credential for the user account;
causing the first computing device to display a first user interface containing the bootstrap security credential and a site verification credential;
causing a second computing device to display a second user interface configured to receive the bootstrap security credential from a user and present the site verification credential; and
authenticating, via at least one or more of the one or more computing devices, the second computing device for access to the user account based at least in part on the bootstrap security credential being manually entered in the second user interface, the bootstrap security credential received from the second computing device in an authentication request from the second computing device that excludes the security credential, the second computing device excluding visual cues indicating that a second current application executed by the second computing device is legitimate.

13. The method of claim 12, further comprising:
receiving, via at least one or more of the one or more computing devices, a request for the bootstrap security credential from the first computing device, wherein the request for the bootstrap security credential comprises a location for use;
determining, via at least one or more of the one or more computing devices, that the second computing device is located further from the location for use than a predefined distance; and
disabling, via at least one or more of the one or more computing devices, access to the user account for the second computing device in response to determining that the second computing device is located further from the location for use than the predefined distance.

14. The method of claim 12, further comprising:
receiving, via at least one or more of the one or more computing devices, a request for the bootstrap security credential from the first computing device, wherein the request for the bootstrap security credential comprises a location for use;
determining, via at least one or more of the one or more computing devices, that the second computing device is located further from the location for use than a predefined distance; and
causing, via at least one or more of the one or more computing devices, the second computing device to render a prompt to confirm whether to continue access to the user account for a new location of the second computing device in response to determining that the second computing device is located further from the location for use than the predefined distance.

15. The method of claim 12, further comprising:
detecting, via at least one or more of the one or more computing devices, a change in a physical location of the second computing device; and
disabling, via at least one or more of the one or more computing devices, access to the user account for the second computing device in response to the change to the physical location.

16. The method of claim 12, wherein the bootstrap security credential comprises an identifier corresponding to the second computing device, and the bootstrap security credential is signed using public-key encryption.

17. The method of claim 12, further comprising:
sending, via at least one or more of the one or more computing devices, another bootstrap security credential to the first computing device that has been authenticated; and
authenticating, via at least one or more of the one or more computing devices, a third computing device for access to the user account based at least in part on the other bootstrap security credential being received from the third computing device in another authentication request that excludes the security credential.

18. The method of claim 17, wherein the bootstrap security credential is manually entered into the second computing device and the other bootstrap security credential is transferred from the first computing device to the third computing device through a network.

19. The method of claim 18, wherein the second computing device is authorized for a higher level of access than the third computing device based at least in part on manually entering the bootstrap security credential into the second computing device and transferring the other bootstrap security credential to the third computing device through the network.

* * * * *